United States Patent [19]
Warner et al.

[11] Patent Number: 5,811,899
[45] Date of Patent: Sep. 22, 1998

[54] SMALL ELECTRIC MOTOR WITH AIRFLOW GUIDE STRUCTURE

[75] Inventors: Robin L. Warner, Mt. Holly Springgs; David B. Finkenbinder, Newville; Gary Biddle, Carlisle, all of Pa.

[73] Assignee: General Signal Corporation, Stamford, Conn.

[21] Appl. No.: 789,142

[22] Filed: Jan. 28, 1997

[51] Int. Cl.[6] .................................................. H02K 1/32
[52] U.S. Cl. .......................... 310/64; 310/63; 310/67 R; 310/90; 417/423.2; 417/366
[58] Field of Search .................. 310/63, 67 R, 310/64; 417/423.2, 366; 415/211.2

[56] References Cited

U.S. PATENT DOCUMENTS

| | | | |
|---|---|---|---|
| 2,244,165 | 6/1941 | MacFarland et al. | 183/63 |
| 2,245,179 | 6/1941 | Boivie | 230/127 |
| 2,296,351 | 9/1942 | Kasper | 230/132 |
| 2,360,211 | 10/1944 | Doughman | 417/423.2 |
| 2,422,860 | 6/1947 | Seyfried | 230/55 |
| 2,486,619 | 11/1949 | Troxler | 230/117 |
| 5,296,769 | 3/1994 | Havens et al. | 310/90 |

*Primary Examiner*—Steven L. Stephan
*Assistant Examiner*—Timothy A. Williams
*Attorney, Agent, or Firm*—Milton E. Kleinman; Robert R. Hubbard; Robert S. Smith

[57] ABSTRACT

A motor and fan apparatus a centrifugal fan including a generally circular impeller having a plurality of generally radial vanes. The apparatus also includes a common shaft on which the impeller and the rotor are mounted in axially spaced relation. A circular pan shaped cover encloses the impeller and has a centrally disposed inlet and a wall disposed around the periphery of the impeller in spaced relationship from the periphery of the impeller. A fluid barrier is disposed axially adjacent to the impeller. The barrier and the cover collectively direct fluid flow from the periphery of the impeller in an axial direction parallel to the shaft. The apparatus includes a housing disposed axially adjacent to the barrier. The housing has a generally toroidal shaped part and a smaller generally circular shaped part, the generally toroidal shaped part and the generally circular shaped part are disposed in generally concentric relationship. The generally circular part includes a socket for a first bearing that supports the shaft, the housing including a plurality of generally radially extending curved vanes depending from the toroidal shaped part and abutting the barrier member. The generally radially extending vanes are disposed at intervals about the angular extent of the generally toroidal shaped part whereby fluid flow from the periphery of the impeller continues up and around the barrier member, intermediate adjacent vanes and upwards intermediate the generally circular part and the generally toroidal shaped part. The generally toroidal shaped part has a cross section that has the maximum height at the periphery thereof and a surface intermediate adjacent vanes which slopes upward at all parts thereof which are progressively closer to the geometric center thereof. In some forms of the invention the surfaces intermediate adjacent vanes slopes upward at a progressively increasing rate at all parts thereof which are progressively closer to the geometric center thereof and at least two spokes couple the generally circular shaped part and the generally toroidal shaped part and the spokes are joined to two of the vanes.

5 Claims, 3 Drawing Sheets

SMALL ELECTRIC MOTOR WITH AIRFLOW GUIDE STRUCTURE

RELATED APPLICATIONS

This application is being filed simultaneously with two other applications having the same inventors and the same assignee as this application. The applications are entitled *End Bracket Construction for Small Electric Motors* and *Electrical Appliance with Novel Electrical Power Connector Structure*.

BACKGROUND OF THE INVENTION

The invention relates to electric appliances such as electric motors and particularly to the structural characteristics of such motors that affect the flow of air over the windings and other internal structure thereof. While the invention has particular application to small and inexpensive motors used in various applications, such as electric vacuum cleaners, it will be understood that the invention also has application to a wide variety of other electric motors in which it is desired to direct the air flow within the motor to provide cooling for the component parts of the motor.

In the case of vacuum cleaners it is common for the motor and fan assembly to be manufactured in a plant that is separate from the plant in which the final assembly of the entire vacuum cleaner is completed. The motor and fan assembly includes a fan that provides airflow for the vacuum operation. In a typical motor and fan assembly the air flow produced by the fan provides cooling for the motor by directing the airflow through the motor. The contour of the structural elements of the assembly is of vital importance to the aerodynamic characteristics of the motor and fan. The aerodynamic characteristics affect the cooling of the motor and the capacity of the vacuum. In some cases even seemingly subtle changes in contour make a material difference in performance.

There are a variety of approaches to redirect the substantially radial flow produced by the rotating impeller disposed in a fan cover to an axial flow at substantially a right angle to the radial flow. In a typical construction the fan cover has an axially disposed inlet for directing inlet air into the fan. A centrifugal impeller has a plurality of vanes extending between the periphery of the impeller and points near the inlet in the cover. The housing of the motor in cooperation with the fan cover converts the centrifugal flow into axial flow. The housing also supports a lower bearing for the impeller and the rotor of the motor that is part of the assembly. The most efficient systems convert the rotational velocity head of the impeller to an axial velocity head that flows up through the motor laminations with guide vanes.

The design of the components of the assembly inherently involves a compromise, in many cases, between the for structural rigidity requirements and the aerodynamic characteristics requirements. While the existing designs have been satisfactory for many applications further improvement is still desirable.

SUMMARY OF THE INVENTION

It is an object of the invention to provide a motor and fan assembly having superior aerodynamic characteristics including better motor cooling and produces a greater vacuum pressure.

Another object of the invention is to reduce the surface area of the housing while improving the strength of the housing and the support for the lower bearing carried by the housing.

Still another object of the invention is to reduce the aerodynamic drag caused by he housing and to provide a more streamlined flow within the assembly.

Yet another object of the invention is to reduce the amount of material, such as plastic resin, required to manufacture the assembly.

It has now been found that these and other objects of the invention may be achieved in a motor and fan apparatus a centrifugal fan including a generally circular impeller, the impeller having a plurality of generally radial vanes, a common shaft on which the impeller and the rotor are mounted in axially spaced relation, a circular pan shaped cover enclosing the impeller and having a centrally disposed inlet and a wall disposed around the periphery of the impeller in spaced relationship from the periphery of the impeller, and a fluid barrier disposed axially adjacent to the impeller, the barrier and the cover collectively directing fluid flow from the periphery of the impeller in an axial direction parallel to the shaft. The apparatus includes a housing disposed axially adjacent to the barrier, the housing having a generally toroidal shaped part and a smaller generally circular shaped part, the generally toroidal shaped part and the generally circular shaped part being disposed in generally concentric relationship, the generally circular part including a socket for a first bearing, the first bearing supporting the shaft, the housing including a plurality of generally radially extending curved vanes depending from the toroidal shaped part and abutting the barrier member, the generally radially extending vanes being disposed at intervals about the angular extent of the generally toroidal shaped part whereby fluid flow from the periphery of the impeller continues up and around the barrier member, intermediate adjacent vanes and upwards intermediate the generally circular part and the generally toroidal shaped part, the generally toroidal shaped part having a cross section that has the maximum height at the periphery thereof and a surface intermediate adjacent vanes which slopes upward at all parts thereof which are progressively closer to the geometric center thereof.

In some forms of the invention the surfaces intermediate adjacent vanes slope upward at a progressively increasing rate at all parts thereof which are progressively closer to the geometric center thereof and at least two spokes couple the generally circular shaped part and the generally toroidal shaped part and the spokes are joined to two of the vanes. Each of the spokes may have a curved shaped and the curved shaped spoke and the curved vanes have contours that flow into each other.

BRIEF DESCRIPTION OF THE DRAWING

The invention will be better understood by reference to the accompanying drawing in which.

DESCRIPTION OF THE PREFERRED EMBODIMENT

Figure 1:
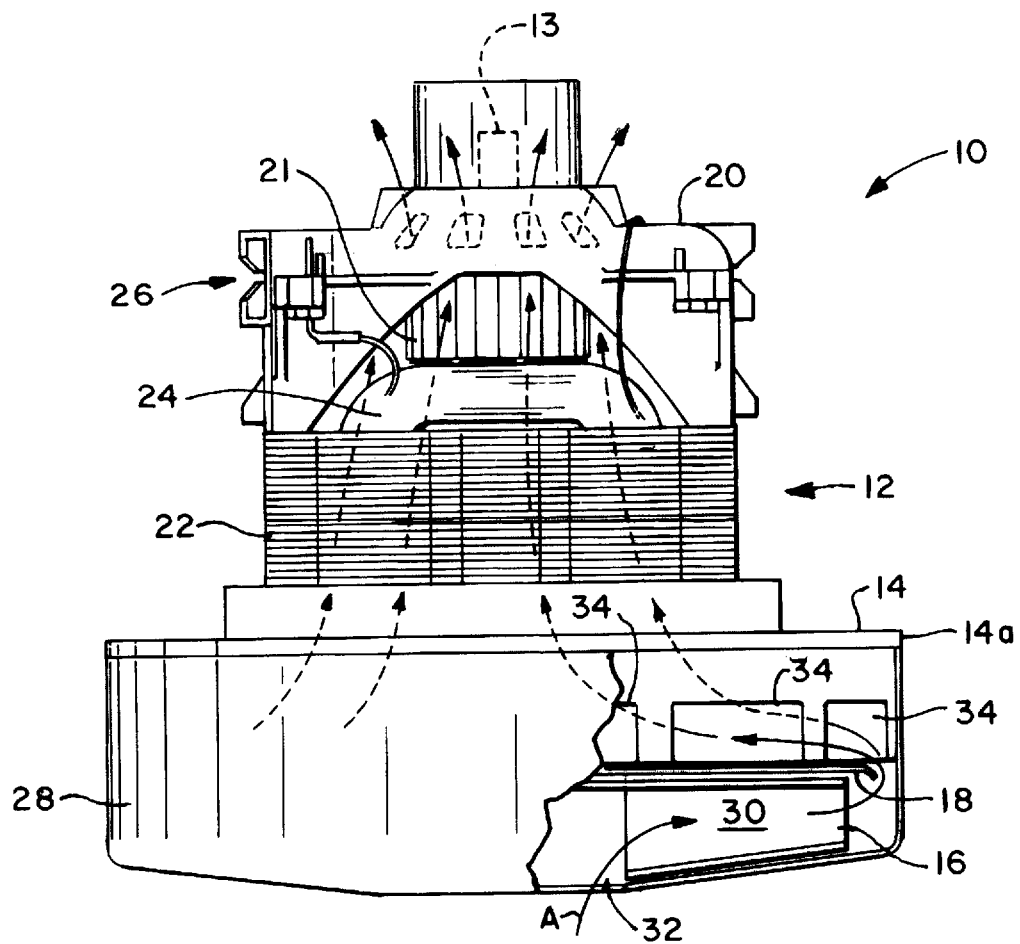
FIG. 1 is partially broken away, partially schematic elevational view of a fan and motor assembly which incorporates the present invention.
Figure 2:
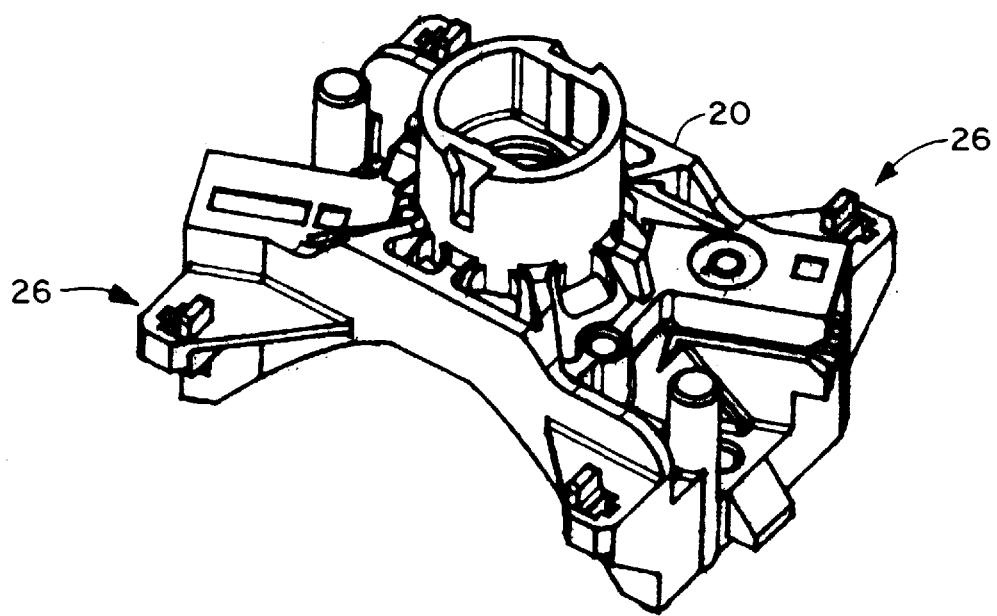
FIG. 2 is an isometric view of the motor end bracket shown in FIG. 1.

Referring now to FIG. 1 there is shown a motor and fan assembly 10 that includes a motor 12, a housing 14, an impeller 16 and a circular plate 18. The motor 12 has a shaft 13 (shown in dashed line in FIG. 1) on which the impeller 16 is carried whereby rotation of the shaft 13 causes rotation of the impeller 16. The shaft 13 is supported by a first bearing (not shown) carried by the housing 14 and a second bearing (not shown) carried by a motor end bracket 20. The motor 12 includes laminations 22, a winding 24, terminations 26 (one shown in FIG. 1) and a commutator 21. A pan shaped fan cover 28 extends around the periphery of the impeller 16, the plate 18 and part of the housing 14. More specifically, the cover 28 abuts against a lip 14a on the housing 14.

The impeller 16, disposed within the pan shaped cover 28, includes a plurality of generally radial curved vanes 30. Ambient air A is drawn into the motor and fan assembly 10 through a central circular opening 32 and forced to the periphery of the impeller 16. The circular plate 18 obstructs flow upward except around the periphery of the plate 18. This upward flow around the periphery of the plate 18 is directed by a plurality of generally radial curved vanes 34 that are molded as an integral part of the housing 14. The flow of air A is directed between the vanes 34 that, in combination with other surfaces in the housing 14, direct the flow of the air A over the surfaces of the laminations 22, the winding 24 and the surface of the commutator 21 In the preferred embodiment the housing 14 is bolted to the motor end bracket 20. Thus, the laminations are clamped firmly together by the bolts engaging both the bracket 20 and the housing 14.

Figure 3:
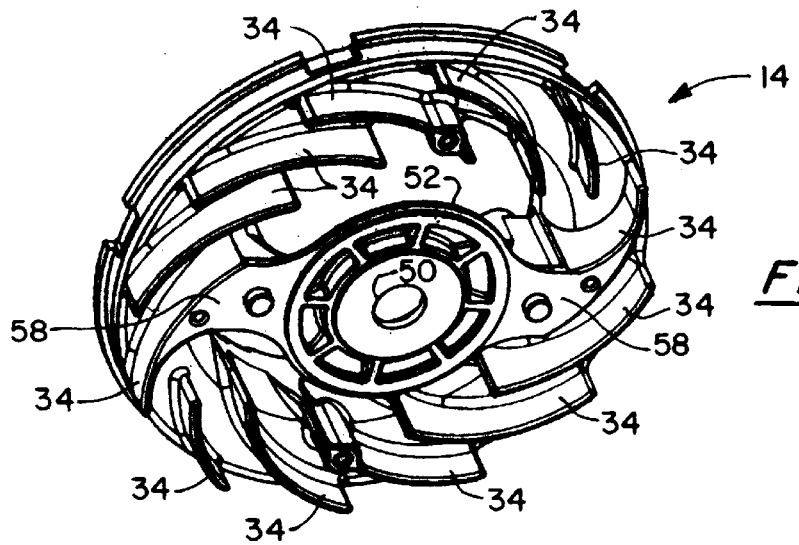
FIG. 3 is a perspective view of the bottom (as viewed) of the housing disposed axially intermediate the impeller and the motor.
Figure 4:
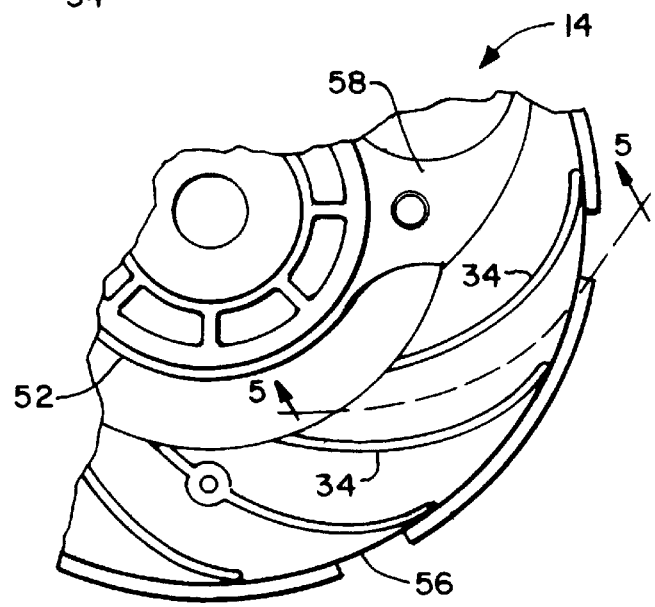
FIG. 4 is a fragmentary bottom view of the housing shown in FIG. 3.

Referring now to FIGS. 3–4 there is shown the bottom (as viewed in FIG. 1) of the housing 14 that is also visible in FIG. 1. The housing 14 includes a central circular recess (not shown in the drawings) that is coaxial with a bore 50 through which the shaft 13 carries the impeller 16 and the rotor of the motor including the armature 21. This recess is on the top face of the housing 14. The structure in which the recess is defined is the circular central part 52 of the housing 14. As noted above the housing includes a plurality of generally radial curved vanes 34 that are molded as an integral part of the housing 14. These vanes 34 are curved and the curvature approaches the contour of an arc. As best seen in FIGS. 3 and 4 the central circular part 52 is joined to a hoop or rim shaped part 56 by two "spokes" 58. The part 56 may also be characterized as being generally torus or toroidal shaped. Each of the spokes 58 is curved and the curve flows or blends into the contour of one of the vanes 34 which the spoke is integrally formed therewith. Stated another way, each of the radial extremities of the spokes 58 has the same general form as the radial extremities of all the other vanes 34. It will also be seen that the spokes 58 have a generally arcuate contour and the center of curvature of the spokes as well the axial extremities of the respective radial extremities of the spokes are substantially coincident. It will be understood that the respective curves are not exactly arcs (parts of a circle) and there is no precise center of curvature for even one part, in most embodiments of the invention) much less exact coincidence. However, it will be understood that the overall contour would be very different, for example, if the "center of curvature" for the main part of the spoke 58 was on a different side of the spoke 58 than the radial extremity of the spoke 58. In that case the overall appearance would more closely resemble an S-shape than the single continuous arc that the preferred embodiment of the invention approaches.

Figure 5:
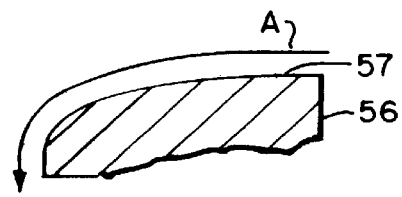
FIG. 5 is a developed cross-sectional view taken along the line 4—4 of in FIG. 4.
Figure 6:
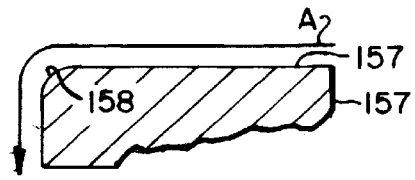
FIG. 6 is a developed cross-sectional view taken along the line 4—4 of a typical prior art housing of the general type shown in FIG. 4.

Still another aspect of the preferred embodiment of the invention is shown in FIG. 5 which must be contrasted with the prior art shown in FIG. 6. As described above the housing 14 includes a rim 56 which carries a plurality of vanes 34 at angularly spaced intervals about the 360 degree angular extent thereof. The cross-sectional contour of the prior art rim 56 is shown in FIG. 6. It will be understood that the views of FIG. 5 and 6 are developed sectional views taken along a curvilinear plane that extends midway through the rim 56 substantially exactly intermediate adjacent vanes 34, 34 as indicted by the line 5—5 in FIG. 5.

In the prior art construction shown in FIG. 6, the cross section of the prior art rim 156 is substantially rectangular except for a radius 158 on the edge 58 of the rim 56 that is on the bottom 157 (as viewed in FIG. 1) of the rim 156 nearest the geometric center of the housing. The contour shown in FIG. 6 results in a very abrupt turn of the air A flowing over the bottom surface 157 of the rim 156 and then bending sharply upward (up in the sense of the FIG. 1 view) to flow through the laminations 22.

The rim 56 of the housing 14 of the preferred form of the invention has a bottom (as viewed in FIG. 1) surface that slopes upward (as viewed in FIG. 1) throughout the entire bottom surface thereof as best seen in FIG. 5. In other words, the entire bottom surface 57 slopes upward so that as air A flows around the plate 18 and intermediate any of the adjacent vanes 34 the slope of the surface that the air A abuts has an upward slope. More particularly, in addition to there being a slope upward on all parts of the bottom of the ring, it will be understood that in the preferred embodiment of the invention the slope upward increases at an increasing rate from the outboard extent of the bottom 57 of the rim 56 to the innermost part of the bottom 57 of the rim 56. Thus, there is not the abrupt change in direction of flow that is inherent in the prior art construction shown in FIG. 6. Those skilled in the art will also recognize that the decrease in surface area inherent in the geometry of the illustrated preferred embodiment produces less drag and thus the present invention has better aerodynamic characteristics than the prior art structure and in addition requires less plastic resin material to manufacture. Accordingly, the end product will cost less to manufacture while maintaining the necessary rigidity for the lower bearing that supports the shaft 13 on which the impeller 16 and the rotor of the motor is carried.

The invention has been described with reference to its illustrated preferred embodiment. Persons skilled in the art of such devices may upon exposure to the teachings herein conceive other variations. Such variations are deemed to be encompassed by the disclosure, the invention being delimited only by the following claims.

We claim:
1. A motor and fan apparatus which comprises:
   a motor having a rotor;
   a centrifugal fan including a generally circular impeller, said impeller having a plurality of generally radial vanes;
   a common shaft on which said impeller and said rotor are mounted in axially spaced relation, said shaft having a first end and a second end, said impeller being located proximate to said first end and said rotor being located proximate to said second end;
   a circular pan shaped cover enclosing said impeller and having a centrally disposed inlet and a wall disposed around the periphery of said impeller in spaced relationship from the periphery of said impeller;
   a fluid barrier disposed axially adjacent to said impeller, said fluid barrier and said cover collectively directing fluid flow from the periphery of said impeller toward said second end of said shaft; and a housing disposed axially adjacent to said fluid barrier, said housing having a generally toroidal shaped part and a smaller generally circular shaped part, said generally toroidal shaped part and said generally circular shaped part being disposed in generally concentric relationship, said generally circular part including a socket for a first bearing, said first bearing supporting said shaft, said housing including a plurality of generally radially extending curved vanes depending from said toroidal shaped part and abutting said fluid barrier, said generally radially extending vanes being disposed at intervals about the angular extent of said generally toroidal shaped part whereby fluid flow from the periphery of said impeller continues around said fluid barrier toward said second end intermediate adjacent vanes and intermediate said generally circular part and said generally toroidal shaped part, said generally toroidal shaped part having a cross section that has the maximum height at the periphery thereof and a surface intermediate adjacent vanes which slopes toward said second end at all parts thereof which are closer to the geometric center thereof.

2. The apparatus as described in claim 1 wherein:

said surfaces intermediate adjacent vanes slope toward said second end at a progressively increasing rate at parts that are progressively closer to the geometric center thereof.

3. The apparatus as described in claim 2 further including:

at least two spokes coupling said generally circular shaped part and said generally toroidal shaped part, said spokes being joined to two of said vanes.

4. The apparatus as described in claim 3 wherein:

each of said spokes has a curved shaped.

5. The apparatus as described in claim 4 wherein:

said curved shaped spoke and said curved vanes have contours that flow into each other.

\* \* \* \* \*